Aug. 16, 1938.　　　　E. ROSS　　　　2,127,143
TALKING MOTION PICTURE PROJECTOR
Filed July 16, 1935　　　8 Sheets-Sheet 1

INVENTOR
ERNEST ROSS
BY W. E. Beatty
ATTORNEY

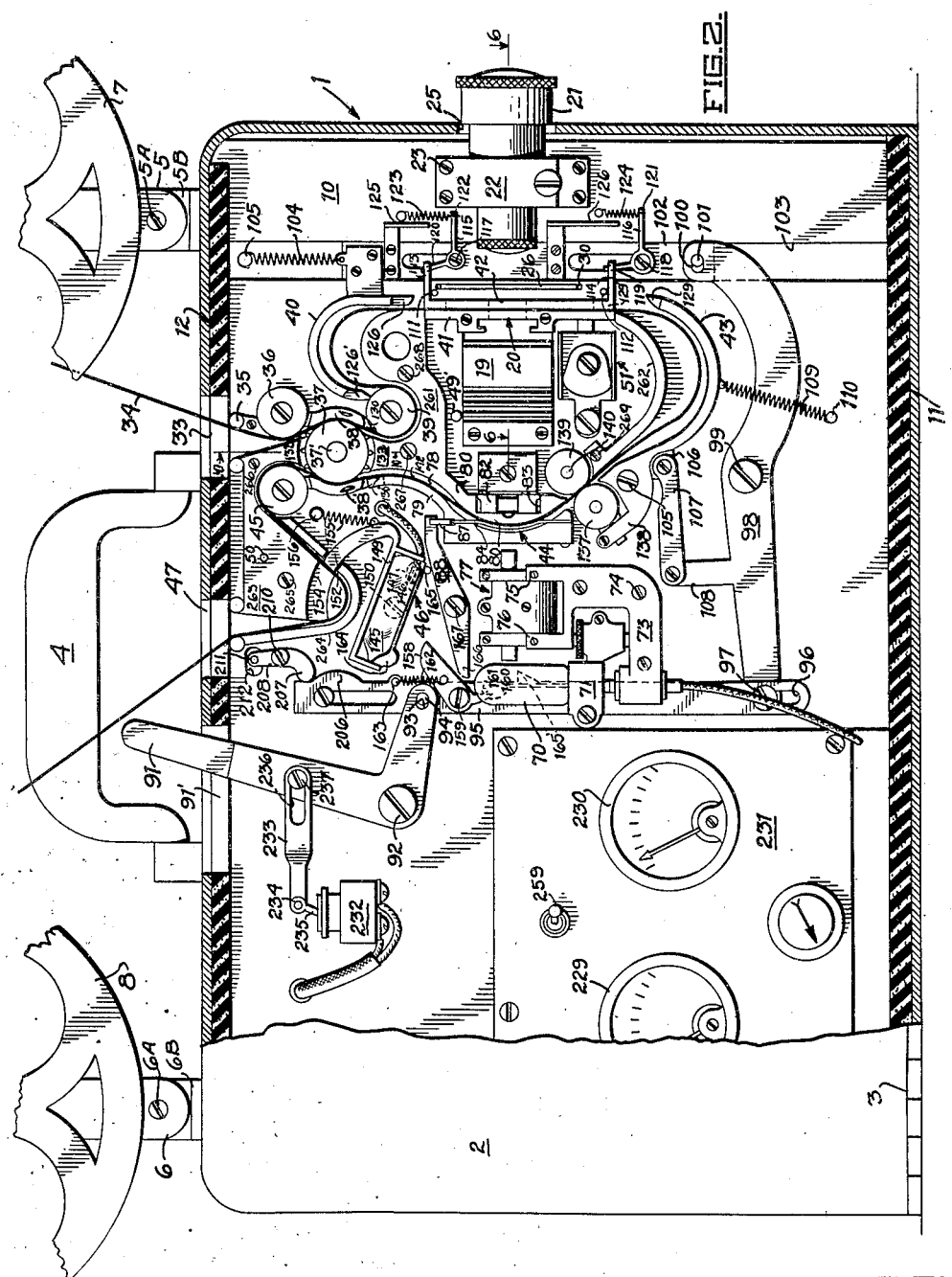

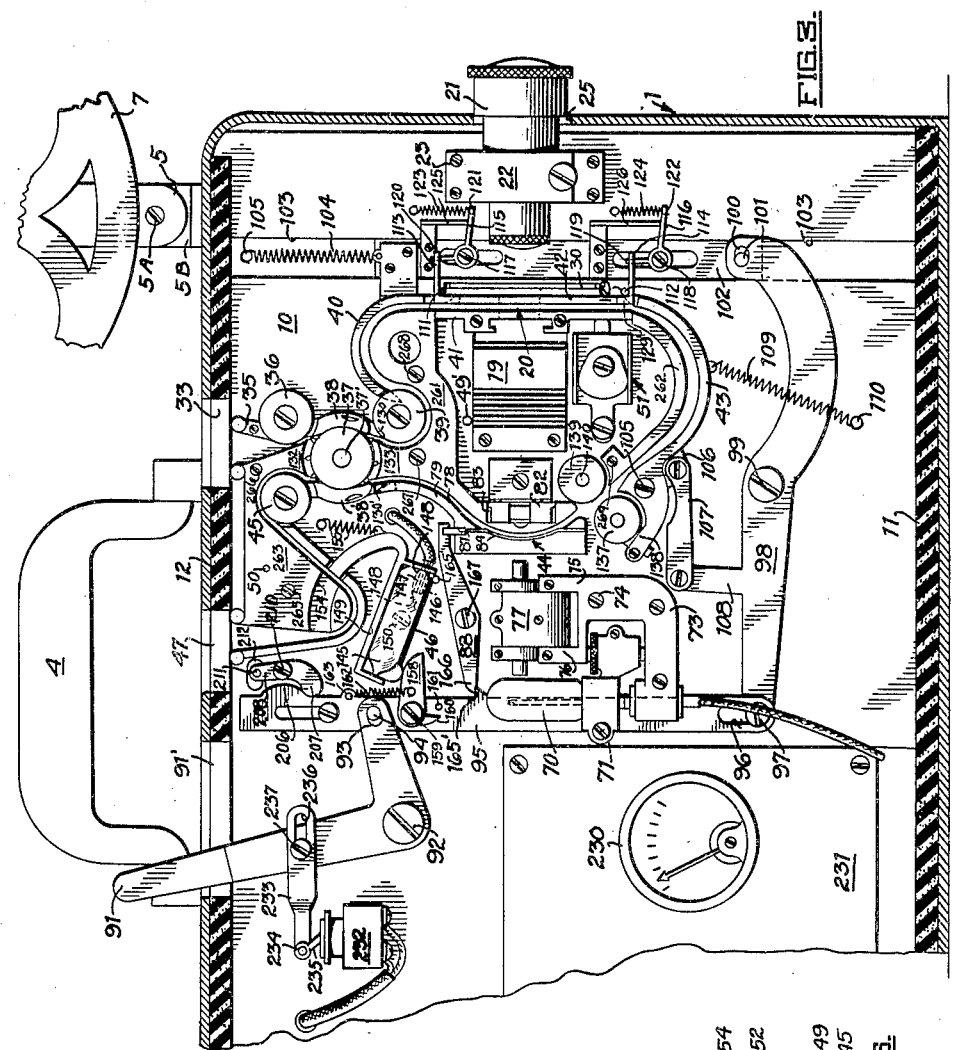
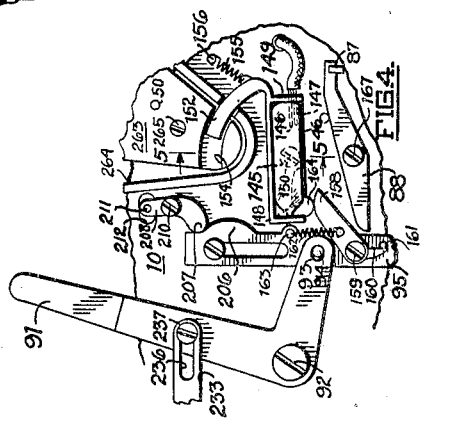

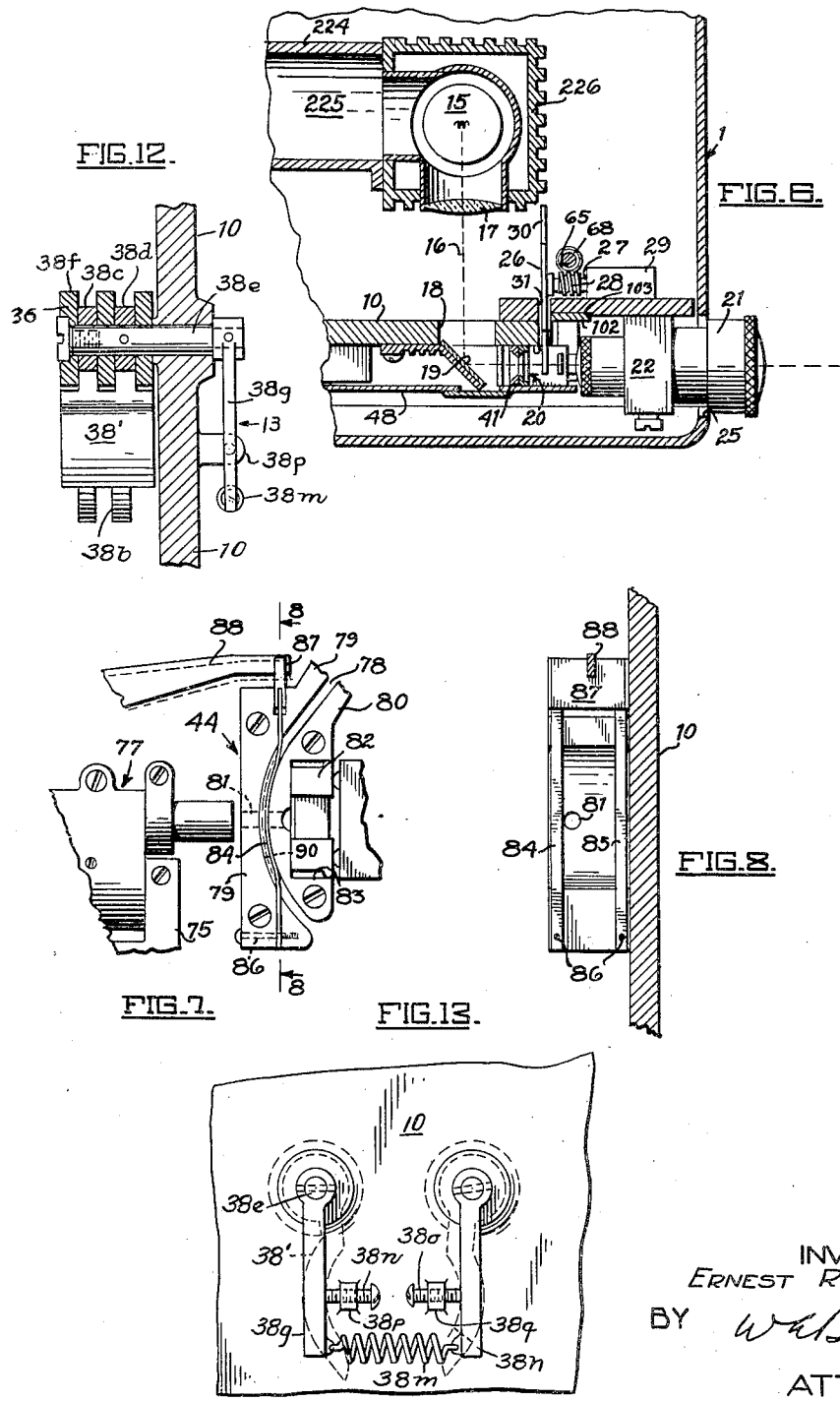

Aug. 16, 1938.  E. ROSS  2,127,143
TALKING MOTION PICTURE PROJECTOR
Filed July 16, 1935  8 Sheets-Sheet 5

INVENTOR.
Ernest Ross
BY W E Beatty
ATTORNEY.

Aug. 16, 1938.  E. ROSS  2,127,143
TALKING MOTION PICTURE PROJECTOR
Filed July 16, 1935  8 Sheets-Sheet 6
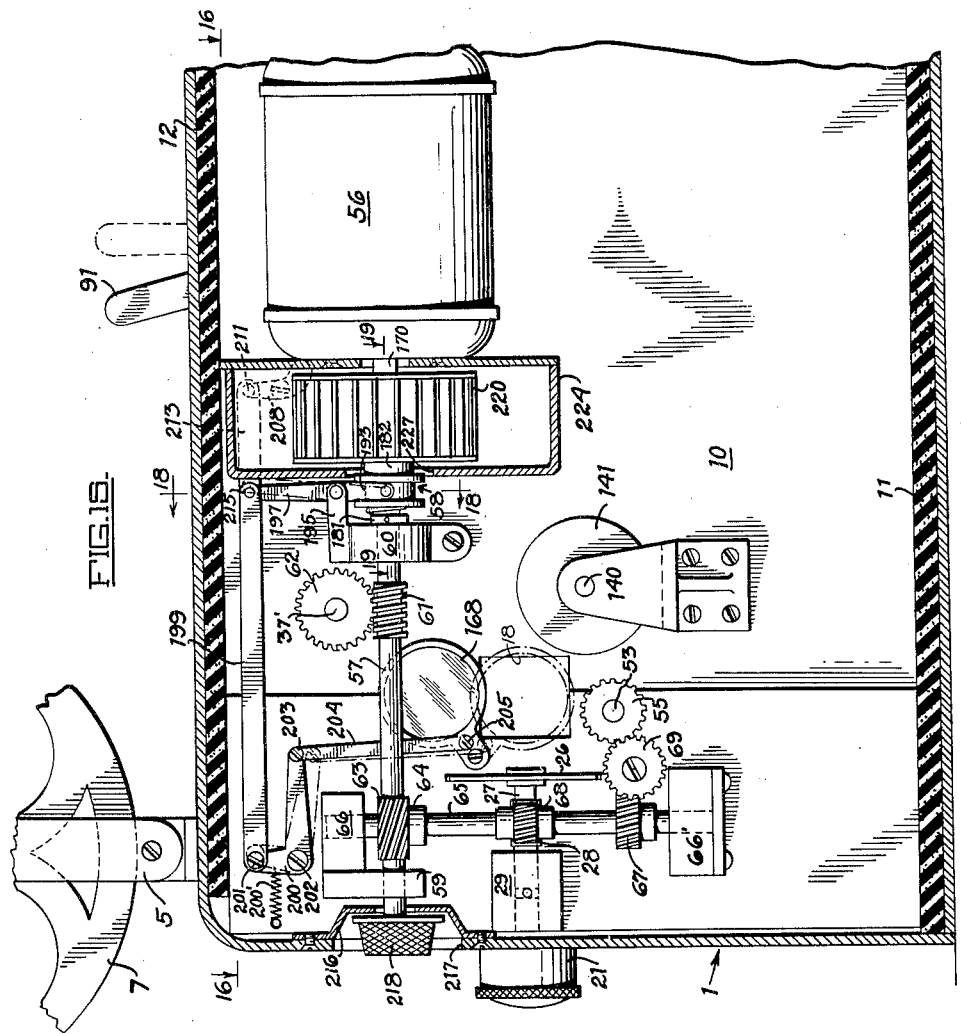
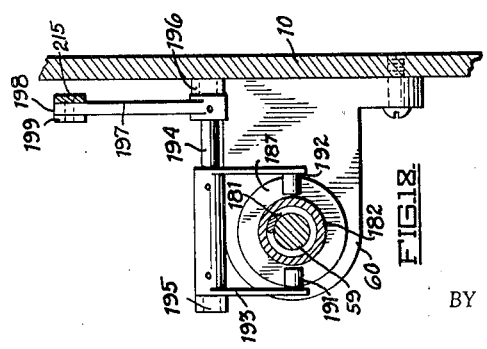
INVENTOR.
ERNEST ROSS
BY W. E. Beatty
ATTORNEY.

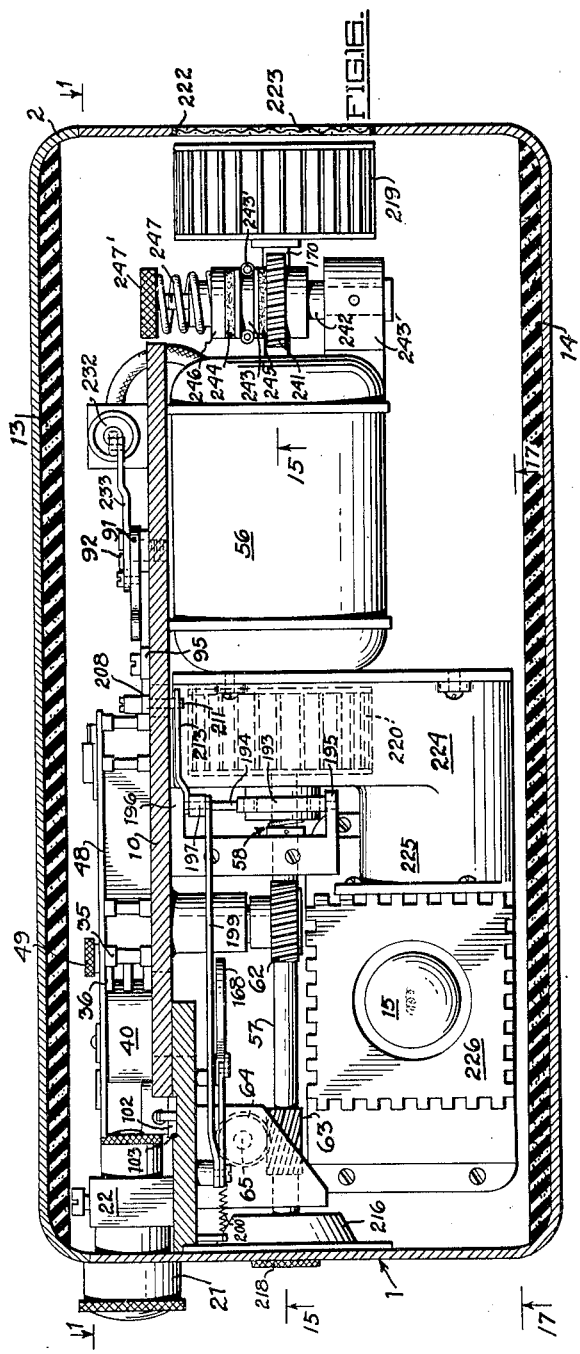

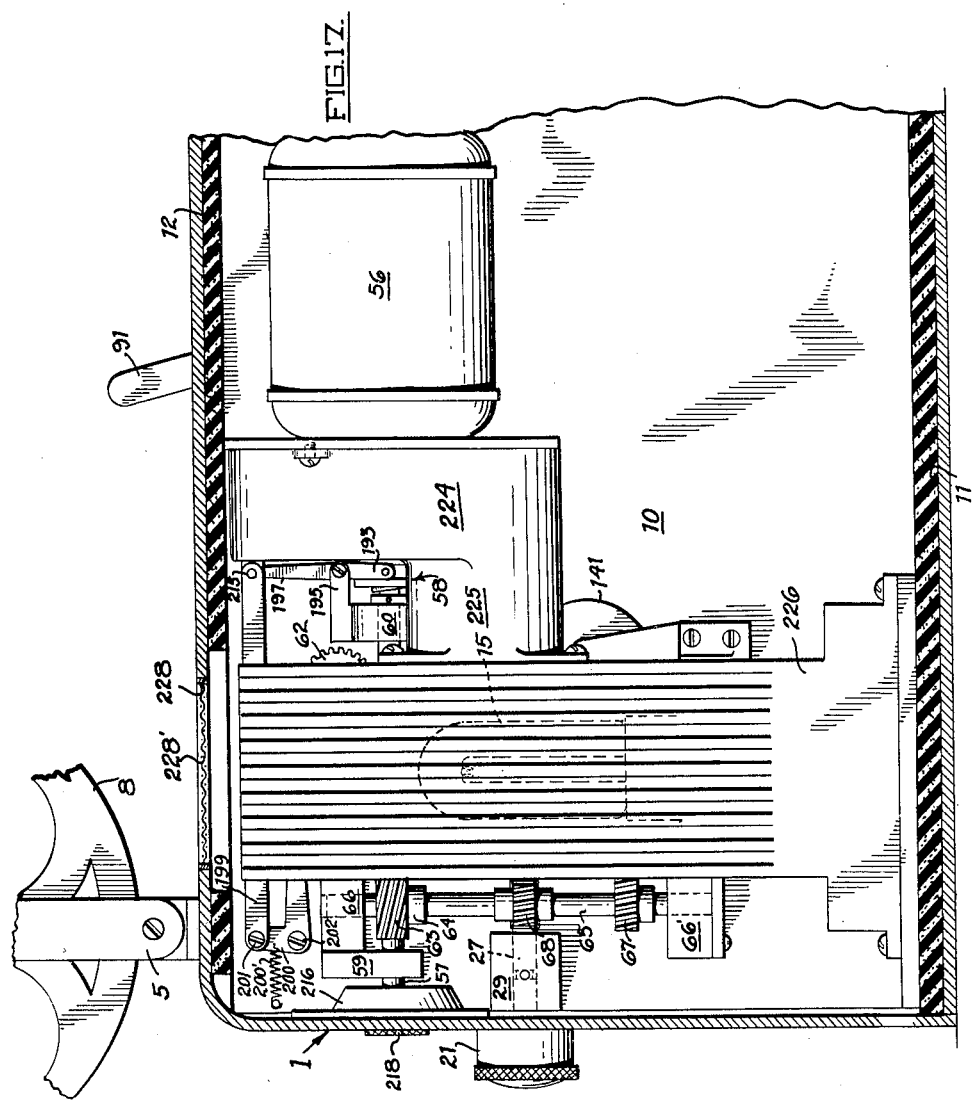

Patented Aug. 16, 1938

2,127,143

UNITED STATES PATENT OFFICE 2,127,143

TALKING MOTION PICTURE PROJECTOR

Ernest Ross, Elmhurst, Long Island, N. Y., assignor to United Research Corporation, Long Island City, N. Y., a corporation of Delaware Application July 16, 1935, Serial No. 31,546

6 Claims. (Cl. 88—16.2)

This invention relates to a talking motion picture projector and sound reproducer, and particularly to a portable unit suitable for use in the home.

An object of the invention is to project pictures and reproduce sound efficiently and with high quality with a portable talking motion picture projecting unit.

Another object of the invention is to facilitate the threading of the film in a portable picture projector unit and to obtain certain safety factors therein.

A further object of the invention is to provide a talking motion picture portable unit suitable for the projection of silent motion and still pictures.

Talking motion picture projectors with sound reproducing units are well known in the art, particularly for use in theatres. This apparatus is bulky and heavy and requires space and the services of skilled operators.

The present invention contemplates a device which will project sound or talking motion pictures and which is sufficiently compact and contained as to render it easily portable from place to place. Further, its operation has been simplified to the point where it is suitable for use in the home by unskilled operators.

There are several salient features of the unit such as a self threading system which requires only that the film be started at the feed sprocket and attached to the take-up reel; the provision of a loop between the sound and picture apertures to minimize drive sprocket distortion; and the flexibility of the unit which permits the apparatus to function for silent, sound, or still pictures by simply moving a lever into one of three positions. A high safety factor has been built into the unit which prevents burning or deterioration of the film in case of a film breakage or stoppage during projection, while the apparatus is provided with a cooling system for preventing undue heating by the motor and projection lamp. It also has an automatic speed control which provides for regulation of the speed at two different values, desirable for silent and sound pictures.

Other features will be apparent from the details of the invention which will be more fully understood from the following description read in conjunction with the accompanying drawings, in which Fig. 1 is a sectional elevational view of a portable talking motion picture projector, the view being taken in a plane represented by line 1—1 of Fig. 16 in which the mechanism is in the "stop" position.

Fig. 2 is a view similar to that of Fig. 1 but having the film guide cover plate removed and the mechanism in running position for the projection of moving pictures.

Fig. 3 is a view similar to that of Fig. 2 but showing the mechanism in threaded position.

Fig. 4 is a view of part of the projector showing the safety switch in open position as in the case of a break in the film.

Fig. 5 is a sectional view taken in a plane represented by line 5—5 of Fig. 4.

Fig. 6 is a plan sectional view of part of the projector taken in a plane represented by line 6—6 of Fig. 2.

Fig. 7 is a view of the sound gate and parts connected therewith.

Fig. 8 is a sectional elevational view taken on the line 8—8 of Fig. 7.

Fig. 12 is a view taken along line 12—12 of Fig. 11.

Fig. 13 is a view taken in the direction of the arrow 13 of Fig. 12.

Fig. 15 is a sectional elevational view taken in a plane represented by line 15—15 of Fig. 16.

Fig. 16 is a sectional plan view taken in a plane represented by line 16—16 of Fig. 15.

Fig. 17 is a sectional elevational view taken in a plane represented by line 17—17 of Fig. 16.

Fig. 18 is a sectional view taken on line 18—18 of Fig. 15 and shows part of the clutch actuating members.

Fig. 19 is a sectional view taken on line 19—19 of Fig. 15 and shows the clutch for disengaging the film feeding mechanism.

Fig. 20 is a sectional view taken on line 20—20 of Fig. 19; and

Fig. 21 is a sectional view taken on line 21—21 of Fig. 19.

Figure 1:
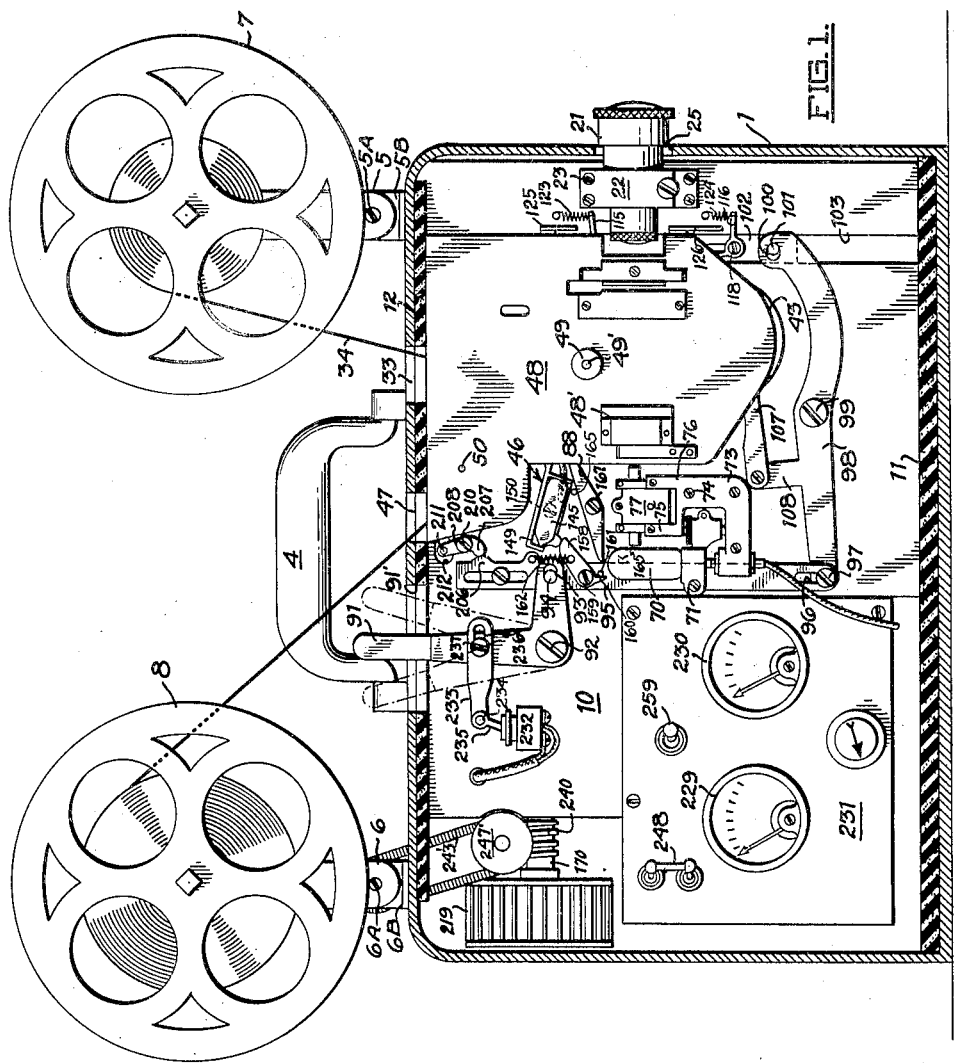

More particularly describing my invention, as herein illustrated, the projecting apparatus is shown as being enclosed in a casing 1 which has a door 2 on one side hinged to the base of the casing as indicated at 3 to provide access to the interior. A handle 4 is provided at the top for the purpose of carrying the projector. Standards 5 and 6 mounted on the top of the casing 1 carry the supply reel 7 and the take-up reel 8. The standards 5 and 6 are pivotally mounted at 5a and 6a to lugs 5b and 6b so that they may be folded down on the top of the casing 1 when not in use or when the projector is being carried. A suitable ball and detent arrangement (not shown) holds the standards 5 and 6 in position when the reels are in position. In order to facilitate the assembling of the mechanism and also to simplify the arrangement of the parts, most of the mechanism is mounted on a main vertical wall 10 which is in turn mounted on a layer of resilient material 11 such as sponge rubber. The material 11 also lines the sides and top of the casing 1 as at 12, 13 and 14, and therefore serves not only to absorb the vibrations but also to absorb the sound produced by the moving parts.

Picture projection

Referring now to Fig. 6, it will be seen that the projection lamp 15 is mounted behind the main wall 10. The light rays, indicated by the dotted line 16, pass through a condenser lens 17, through an aperture 18 formed in wall 10, and thence onto a reflecting mirror 19 mounted on the front of the wall 10. From the mirror 19 the rays are reflected in a path substantially at right angles to their original direction and pass through a picture gate 20 into the projection lens 21 from whence they are projected onto a picture screen. The projection lens 21 is mounted in a block 22 secured to the wall 10 by screws 23 and projects through an aperture 25 formed in the front wall of the casing 1.

A film shutter 26 is mounted on a shaft 27 parallel to the line of projection and has a spiral gear 28 thereon, the shaft 27 being rotatably mounted in a bearing block 29 secured to the rear of the wall section 10. The blades 30 of the shutter 26 project through a slot 31 formed in the wall 10 and are adapted to intercept the path of light at a point between the picture gate 20 and the projection lamp 15.

A slot 33 is provided in the casing 1 below the supply reel 7 to receive the film 34. Guide pieces 35 and 36 direct the film onto a single drive sprocket 37. This sprocket 37 is mounted on a shaft 37' which is journaled in the rear wall 10. Spring pressed shoes 38 and 38' (more fully described hereinafter in connection with Figs. 12 and 13) on either side of the sprocket 37 maintain the film in engagement with the sprocket at all times. From the sprocket 37 the film 34 is fed under a cylindrical guide 39 and into a loop forming member 40, which will be more fully explained hereinafter. From the loop former 40 the film moves between a vertical guide member 41 and a pressure pad 42, forming the film gate, to a lower loop former 43 and thence upward through a sound gate 44 onto the rear side of the sprocket 37. The film then moves over a cylindrical guide 45, past a safety switch 46, and finally up through a slot 47 provided in the casing 1, onto the take-up reel 8.

A cover plate 48 is provided which fits over the face of the film guides as will be seen in Fig. 1, the purpose of which is to confine the film within the guide passage and prevent it from shifting sideways. A cap 48' provided on the plate 48 allows the light sensitive cell 82 to project thereinto. A nut 49 threadably mounted on a stud 49' provided in the wall 10 is adapted to hold the plate 48 in place. A locating pin 50 provided in the wall 10 projects through an opening in the plate 48 to locate the plate in position. Therefore, it will be seen that by merely loosening the nut 49 the plate 48 may be removed to obtain access to the interior for inspection or adjustment.

An intermittent film feeding mechanism 51 is provided below the mirror 19 for advancing the film in a step by step movement before the film gate 20. The details of construction of the above mechanism 51 are shown and described in my co-pending application Serial No. 744,947 filed September 21, 1934. A shaft 53 which actuates the mechanism 51 is journaled in the rear wall 10 and has a gear 55 secured to the rear end thereof as will be seen in Fig. 15.

Referring now to Figs. 15 and 16, a motor 56 mounted on the wall 10 drives a shaft 57 through a clutch 58 which will be described hereinafter. The shaft 57 is journaled in bearings 59 and 60 and has formed thereon a worm 61 which drives a worm gear 62 secured to the rear end portion of the drive sprocket shaft 37'. A spiral gear 63 also formed on the shaft 57 drives a second spiral gear 64 mounted on a vertical shaft 65 which is journaled in bearings 66 and 66' mounted on the back of the wall 10. A spiral gear 68 mounted on the central portion of the shaft 65 drives the film shutter 26 through the gear 28. Another spiral gear 67 mounted on the lower portion of the shaft 55 drives an idler gear 69 which in turn drives the gear 65 attached to the film feeding mechanism shaft 53. It will therefore be seen that the drive sprocket 37, the film shutter 26, and the intermittent film feeding mechanism are positively driven together.

Projection of still pictures

As was stated in the foregoing description, one function of the projector is to project "still" pictures. Because of the great amount of heat generated by the projection lamp, it is necessary to keep the ventilating fans and consequently the motor operating, and at the same time the film feeding mechanism must be disconnected. For this purpose, I employ the clutch 58 as shown in Figs. 16–21. Also, because of the great amount of heat focused upon the film, which in this instance is stationary, it is necessary to provide a "fire shutter" 168 which is adapted to lie between the lamp and the film when the projector is in a "still" position, but which can be swung out of the way when the projector is in "running" position. The purpose of the film shutter 168 is to filter or cut down the amount of heat projected therethrough, and is generally made either of a special heat resisting glass or of ordinary glass having a very thin sheet of gold foil on one side thereof. Both the clutch 58 and the shutter 168 are actuated cooperatively with the movement of the operating lever 91 into "still" position, as will be described hereinafter.

Referring now to Figs. 16–21 inclusive, the clutch 58 shown in this form of my invention is of the "multiple disc" type and comprises a hub member 169 keyed to motor shaft 170 as at 171. At the front of the hub 169 is an annular opening 172 having a series of longitudinal grooves 173 spaced on the inner periphery thereof and which are adapted to be engaged by discs 174 preferably of fiber, having corresponding tooth projections 175 thereon to prevent rotation of the discs relative to the hub 169 and at the same time to permit longitudinal movement of the discs 174. The discs 174 have openings 176 in the center thereof. Alternately spaced between the discs 174 are discs 177 having square openings 178 in the center thereof and adapted to slidably engage a squared end portion 179 of the shaft 59. The discs 177 are preferably made of a harder material such as steel. Rigidly mounted on the shaft 59 adjacent the bearing 60 is a stop collar 181 against which a spring 181' bears. The other end of the spring 181' projects into an enlarged annular groove formed in a sleeve member 182 and engages the shoulder 183 thereof. It will be seen, therefore, that the spring 181' tends to press the head 182' of the sleeve 182 against the discs 174 and 177 thereby establishing connection between the shafts 170 and 59.

Provided in the central portion of the sleeve 182 is a pair of diametrically disposed longitudinal slots 184 and 185 adapted to engage a pin 186 projecting through the shaft 59 so as to allow for longitudinal movement of the sleeve 182 and at the same time prevent its rotation relative to the shaft 59. Provided at the rear of the sleeve member 182 between a pair of circular flanges 187 and 188 is a circular groove 190 adapted to receive pins 191 and 192 mounted on a yoke member 193 the upper end of which is rigidly secured to a shaft 194 and journaled in bearings 195 and 196 secured to the upper portion of the bearings 60 as shown in Fig. 15. Also rigidly attached to the shaft 194 is an arm 197 pivotally connected at its upper end 198 to a rearwardly extending link 199. The other end of the link 199 is pivotally connected to a bell crank 200 as at 201. The bell crank 200 is pivotally mounted to the rear of the wall 10 by a set screw 202. The other end of the bell crank 200 is pivotally attached to a downwardly extending link 204 as at 203. The lower end of the link 204 is attached to the fire shutter 168 as at 205. A spring 200' attached at one end to a pin provided in the wall 10 and at the other end to the upwardly extending portion of the bell crank 200 tends to hold the clutch 58 in engagement and the fire shutter in an upward position.

Referring now to Figs. 1–3, it will be noted that the upper end of the bar 95 has a cam surface 206 provided thereon which is adapted to engage the end 207 of a cam follower 208 pivotally attached to the wall 10 by a set screw 210. The other end of the cam follower 208 has a pin 211 attached thereon and extending through slot 212 provided in the wall 10. The rear end of the pin 211 is attached to the end of a link 213, the other end of which is pivotally connected to the arm 197 as at 215. It will therefore be seen that when the operating lever 91 is moved into "still" position, the cam surface 206 of the bar 95 will engage the end 207 of the lever 208 so as to pull the link 213 and consequently the arm 197 in a rearwardly direction so as to disengage the clutch 58. At the same time that the arm 197 is being moved, the bar 199 will also be actuated so as to allow the fire shutter 168 to drop into position between the projection lamp 15 and the film gate 52.

In stopping the mechanism for a "still" picture after it has been running, it is very seldom that the picture will be stopped in a framed position, that is, in a position where a whole picture frame will be projected upon the screen. For this reason, it is desirable to provide manually operated means for moving the film feeding mechanism to accurately frame the picture. I accomplish this by projecting the end of the shaft 57 through a cup member 216 provided in the rear of the front wall of the casing 1 adjacent an aperture 217 therein. A knurled knob 218 is rigidly mounted to the end of the shaft 57. By grasping the knob 218 with the fingers and twisting it in either direction, the picture may be properly framed.

*Sound reproduction*

Referring now to Fig. 1, a constant intensity lamp 70 is mounted in a base 71 which is adjustably mounted in a bracket 73 secured to the wall 10 as by screws 74. Also mounted in the bracket 73 between two lugs 75 and 76 is a lens assembly 77 through which light is projected from the lamp 70 into the sound gate 44 (see Figs. 7 and 8). The film passage 78 provided in two guides 79 and 80 allows light from the lamp 70 to be projected through the sound track of the picture film 34 and onto a light sensitive cell 82 provided in a recess 83 and in the rear of the guide 80. The details of construction of the light cell 82 and contact points associated therewith are shown and described in co-pending application Serial No. 747,610 filed October 9, 1934. In order to prevent fluctuation of the film as it passes through the sound track, the film is kept in close contact with the curved rear surface of the film passage 78 by means of springs 84 and 85, which bear against either edge of the film and are secured at their lower ends in the bottom of the guide 79 by the screws 86. The upper ends of the springs 84 and 85 are attached to a cross-piece 87 which is adapted to be reciprocated by a lever 88.

In order to prevent the film from sticking in the sound gate when it is being threaded, it is necessary to relieve the pressure of the springs 84 and 85. This is accomplished by depressing the lever 88 which bows the springs into the position shown by the dotted lines 90 of Fig. 7 thereby allowing an unobstructed passage through which the film may be fed. In order to operate the lever 88 cooperatively with the lever 91 when moved to the "threading" position, a projection 165' is provided on the side of the vertical bar 95 which is adapted to strike the end 166 of the lever 88 and thereby bowing the springs 84 and 85 when the lever 91 is moved into threading position. The lever 88 is pivotally mounted to the wall 10 by means of a screw 167.

In order to further assist the tension springs 84 and 85 in the sound gate in smoothing out the fluctuations of the film caused by the intermittent motion of the film past the picture gate 20 before the film passes through the sound gate 44, I provide a free roller 137 mounted on the end 138 of the lower loop former 43 which is adapted to hold the film in engagement with a similar roller 139. The roller 139 is rigidly mounted on a shaft 140, the other end of which carries a flywheel 141 as shown in Fig. 15. It will be seen therefore, that as the film 34 is pulled by the sprocket 37, the film 34 pulls or rotates the rollers 137, 139, the inertia of the flywheel 141 tending to keep the roller 139, and consequently the film 34, going at an even rate of speed.

In the cutting of sprocket teeth, as for example those on the film driving sprocket 37, a series of microscopic ridges are usually left on the surface of the teeth. These ridges impart a slight jerking motion to the film as it is being drawn through the film passage which affects the quality of the sound produced at the sound gate. This condition is minimized by providing a curved passage 142 between the film sprocket 37 and the sound gate 44, thereby forcing the film to travel in a curved path, to give the film resilience, instead of travelling in a straight line from the sound gate 44 to the sprocket 37.

*Automatic threading*

Referring to Fig. 3, it will be noted that a single common sprocket 37 is employed to drive the film through the apparatus. This sprocket 37 is adapted to engage a free end of a film from the supply reel 7, and propel the same through the apparatus, with the parts in threading position as shown in Fig. 3, the film passing through a path which will later be described in detail, to a point beyond the opening 47, whereupon the lever 91 is moved to stop position to enable the operator to fasten the free end of the film to the take-up reel 8 shown in Fig. 1.

During the automatic threading operation, with the parts in the positions shown in Fig. 3, the free end of the film from the supply reel 7 is propelled by the free end of the film after being inserted through the opening 33 and the engagement with the sprocket 37 is propelled by the latter through the following path: between stationary film guide 39 and the adjacent curved portion of guide block 261, between loop former 40 and the adjacent curved portion of guide block 261, through the open picture gate between pressure plate 42 and opposed guide 41, between the curved film guide 262 and loop former 43, between rollers 137 and 139, between the curved portion 80 of guide block 261, which curved portion 80 forms one side of the sound gate 44 on the one hand, and springs 84 and 85 on the other (see Figs. 7 and 8), thence between curved film guide 79 and the opposed curved portion 80 of guide block 261, thence around the left side of the common sprocket 37, thence between the stationary film guide 45 and the adjacent curved portion of guide block 263, thence between the guide block 263 and the V-shaped film guide 264, past the open safety switch 46, around the lower curved portion of guide block 263 and between the same and the adjacent curved portion of film guide 264 and thence in an upwardly direction through the opening 47. The guide block 261 is fastened to plate 10 by screws 267 and 268. The film guide 262 is fastened to plate 10 by screw 269 and by similar screws if desired from the back of plate 10. The guide block 263 is fastened to plate 10 by screws 265 and 266.

The film 34 is held against the common sprocket 37 as follows: Referring now to Figs. 12 and 13, it will be seen that the film shoe 38' has projecting lugs 38c and 38d which are rigidly mounted on a shaft 38e. Interposed between and on either side of the lugs 38c and 38d are cylindrical members 38f which form the guide 36. The shaft 38e is rotatably mounted in the wall 10 and has an arm 38g rigidly mounted on the rear portion thereof. A corresponding arm 38h is connected with the film shoe 38. The lower ends of the arms 38g and 38h are provided with lugs in which are held the ends of a tension spring 38m. Screws 38n and 38o threaded in lugs 38p and 38q mounted on the rear face of the wall 10, comprise stops against which the arms 38g and 38h are adapted to strike thereby limiting the pressure of the film shoes 38 and 38' on the film.

As was stated before, the projector is adapted to automatically thread the film for projecting moving pictures with or without sound, and also to project "still" pictures. In order to selectively accomplish any one of the above results, I provide an operating lever 91 adapted to adjust the mechanism. Fig. 1 shows the lever 91 and mechanism in the "still" projection position, Fig. 2 in running position, and Fig. 3 in the threading position.

The lever 91 which projects through a slot 91' to the rear of the opening 47 is shown as being in the form of a bell crank pivoted at 92 and has a slot 93 in one end adapted to receive a pin 94 mounted on a vertically reciprocable bar 95. The lower end of the bar 95 has a slot 96 provided thereon which is engaged by a pin 97 on the end of a lever 98. The lever 98 is pivoted at 99 and has a slot 100 at the other end engaging a pin 101 on the lower end of a vertically reciprocable bar 102 which is mounted in a groove 103 provided in the wall 10. The upper end of the bar 102 carries the loop former 40 which is semicircular in shape. A spring 104 is provided one end of which is attached to the upper end of the bar 102 and the other end to a pin 105 mounted in a wall 10. It will therefore be seen that the spring 104 always tends to keep the loop former 40 in its uppermost position.

The lower loop former 43 is pivoted at 105 and has a projecting lug 106 on which is pivotally connected a link member 107. The other end of the link 107 is pivotally connected to an inwardly extending projection 108 formed on the lever 98 intermediate the pins 97 and 99. A spring 109, one end of which is attached to the loop former 43 and the other end to a pin 110 provided in the wall 10, tends to keep the loop former 43 in its lowermost position.

It will be seen from the foregoing description that when the operating lever 91 is retracted to threading position as in Fig. 3, the upper loop former 40 will be brought down to its lowermost position while at the same time the lower loop former 43 will be brought upward so as to form a smooth passage through which the film may be threaded.

In order that the pressure pad 42 may be separated from the guide 41 to allow the film to be threaded therethrough, I provide pins 111 and 112 over which flanges 113 and 114 provided on the ends of the pressure pad 42 are adapted to slide. Bell crank levers 115 and 116 adjacent the flanges 113 and 114 are pivoted at 117 and 118 respectively, and the ends 119 and 120 engage slots formed in the outer ends of the flanges 113 and 114. The other ends 121 and 122 of the levers 115 and 116 are engaged by tension springs 123 and 124 which tend to hold the pressure pad 42 in engagement with the guide member 41.

Mounted on the vertical bar 102 are downwardly projecting fingers 125 and 126 which are adapted to strike the ends 121 and 122 of the levers 115 and 116 when the bar 102 is moved downward and therefore effect the separation of the pressure pad 42 from the guide 41.

*Interdigitated joints*

Figure 9:
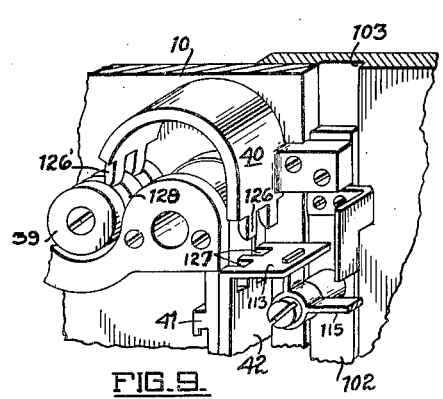
Fig. 9 is a perspective view of part of the device showing the interdigitated fingers on the ends of the loop forming members.

In order to prevent the end of the film from catching or sticking in the film passage when the projector is in automatic threading position, the loop formers 40 and 43 are provided with interdigitating fingers adapted to be received in corresponding slots in the adjacent members. Referring to Fig. 9, the loop former 40 is shown as having interdigitating fingers 126 and 126' formed on either end. The interdigitating fingers 126 are adapted to be received in slots 127 provided in the upper part of the pressure pad 42, while the fingers 126' are adapted to be received in the grooves 128 formed in the cylindrical film guide 39. The member 43 has a pair of fingers 129 receivable in slots 129' in the lower portion of the pressure pad 42.

Figure 10:
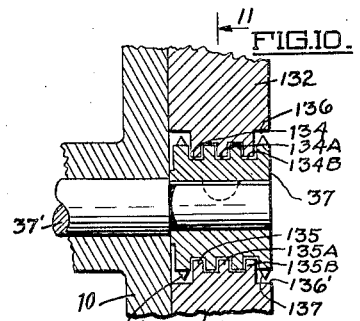
Fig. 10 is a sectional view taken along line 10—10 of Fig. 2.
Figure 11:
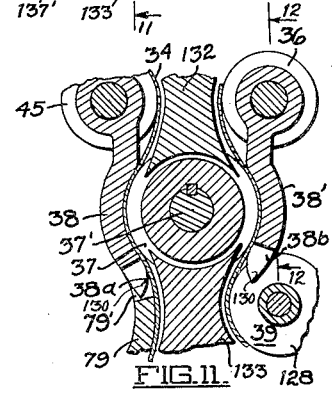
Fig. 11 is a sectional view taken along line 11—11 of Fig. 10.

In order to strip the film off the drive sprocket 37 and to prevent it from catching between the sprocket 37 and the adjacent film guide blocks 132 and 133, these members are also provided with interdigitating projections as will be seen in Figs. 10 and 11. The grooves 134, 134a, and 134b provided on the sprocket 37 receive the projections 135, 135a, and 135b provided on the adjacent end portions of the film guide blocks 132 and 133. Recesses 136 and 136' provided on either side of the guide blocks 132 and 133 allow the teeth 137 and 137' of the sprocket wheel to pass therein. Referring to Fig. 11, it will be seen that the film pressing shoes 38 and 38' are also provided at their lower ends with interdigitating fingers 38a and 38b. The fingers 38b are received in the grooves 128 of the cylindrical guide 39 while the fingers 38a are received in corresponding slots 79' formed on the upper end portion of the film guide 79. The upper ends of the shoes 38 and 38' are pivotally mounted with the cylindrical guide members 36 and 45.

It will be noticed that all the interdigitating fingers such as 38a, 38b, 126, 126', etc., have their ends tapered or curved to prevent the ends of the film from catching thereon.

Safety switch

Referring now to the safety switch 46, it is essential that, in case of film breakage within the projector, the mechanism be stopped before further damage to the film or the mechanism ensues. To attain this object, I provide a "mercury" switch comprising a glass bulb 145 having at one end two electrodes 146 and 147 projecting therein. The electrodes are attached to conductors placed in series with the motor 56 and the lamp 15, as will be noted in Fig. 14. Also placed within the glass bulb 145 is a small quantity of mercury 148. The bulb 145 is mounted in a support 149 shown as being pivotally mounted to the wall 10 by a screw 150. The end of the support 149 adjacent the electrodes 146 and 147 is provided with a pair of curved arms 151 and 152 adapted to move through recesses 153 and 154 provided in opposite edges of the film guide. A spring 155, one end of which is attached to the arm 151 and the other end to a pin 156 provided in the wall 10, tends to pull the switch into the position shown in Fig. 4. Therefore, it will be seen that the ends of the arms 151 and 152 normally ride against the edges of the film 34 as shown in Fig. 2, and thereby keep the mercury 148 in contact with the electrodes 146 and 147 to close the motor circuit. As soon as the film breaks or comes to an end, the spring 155 pulls the arms 151 and 152 into the recesses 153 and 154 thereby tilting the switch and allowing the mercury to flow to the other end of the bulb 145, opening the contact between the two electrodes 146 and 147.

In order to cooperatively retract the safety switch 46 in the threading and stop position by means of the operating lever 91, I provide a lever 158 pivotally mounted to the vertical bar 95 by a cap screw 159. A lug 160, provided on the lever 158 below the screw 159, is adapted to limit the upward travel of the lever 158 by striking stop pin 161 provided on the bar 95. A spring 162 one end of which is attached to the lever 158 and the other end to a pin 163 mounted on the bar 95, tends to hold the lever 158 in its upper position. A projection 164 formed on the mercury switch support 149 is adapted to be engaged by the upper surface of lever 158. Therefore, it will be seen that when the operating lever 91 is thrown into "stop" position, as seen in Fig. 1, the lever 158 will strike the projection 164 and move the switch into the retracted position until the lower surface of the support 149 adjacent the electrodes 146 and 147 engages a stop pin 165, the spring 162 of course being stronger than the spring 155. As the operating lever 91 is still further pulled back into "threading" position as in Fig. 3, the lever 158 is thereby retracted downward against the action of the spring 162 but still holds the switch 46 in a retracted position.

Ventilation

Referring now to Fig. 16, it will be seen that the motor 56 has a pair of fans or blowers 219 and 220 mounted on either side thereof. The blower 219 is mounted directly on the motor shaft 170 while the blower 220 is mounted to the hub 169 of the clutch 58 by means of screws 221. Provided in the rear wall of the casing 1 adjacent the blower 219 is an aperture 222 through which air is drawn by the blower 219 and thence circulated throughout the interior of the projector. A screen 223 is mounted in the aperture 222 to prevent the entrance of foreign matter into the interior, as well as to improve the appearance.

The blower 220 is enclosed within a blower casing 224 having an outlet 225 into the projection lamp housing 226. Air is drawn through the aperture 227 in the casing 224 as shown in Fig. 15, into the blower 220 from whence it is thrown by centrifugal force through the outlet 225 into the lamp housing 226 and thence upwardly through an aperture 228 provided in the top wall of the casing 1 adjacent the lamp housing 226. A screen 228' is mounted within the aperture 228.

Miscellaneous

Meters 229 and 230 mounted on a panel 231 provided on the lower right hand corner of the wall 10 are connected to suitable sound amplifying apparatus (not shown).

Figure 14:
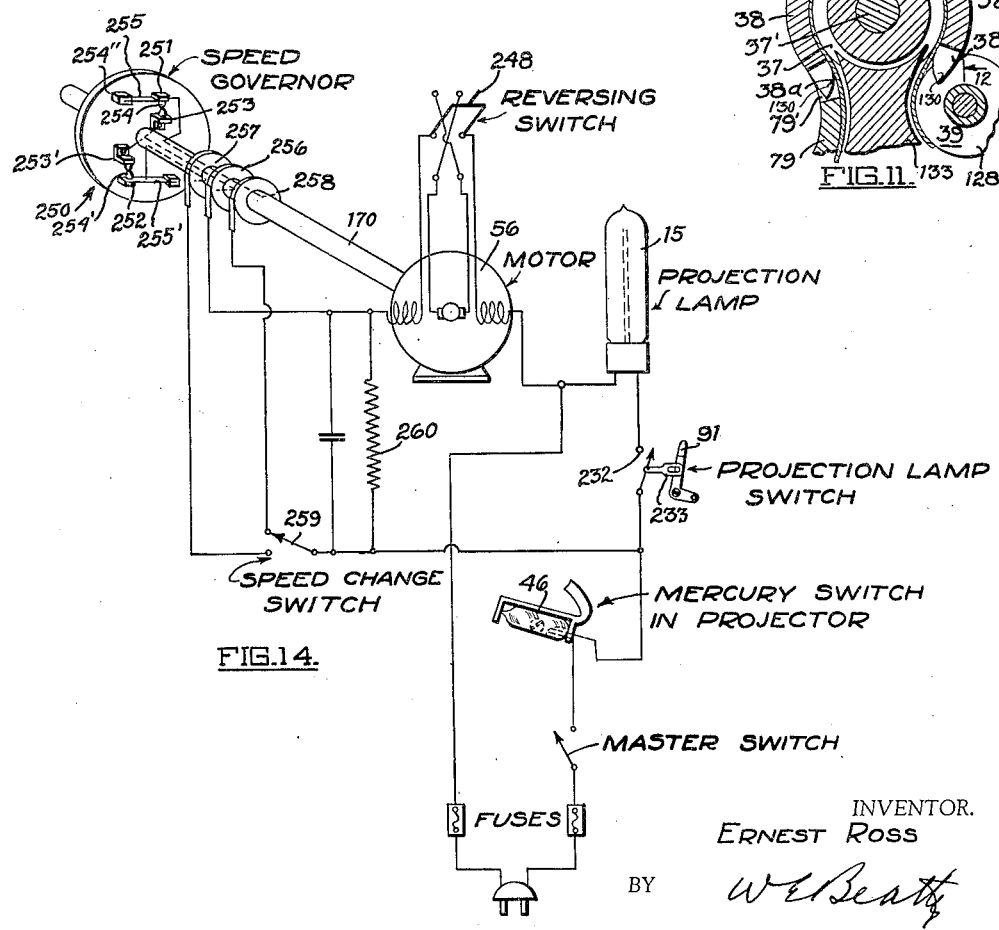
Fig. 14 is a diagrammatical view showing the electrical connections in the device.

If the film should stick or catch in the film passage or should stop for any reason before the light aperture in the film gate 20 while the projector is in threading position, it is possible that the prolonged exposure to the intense heat of the projection lamp 15 would cause the film to catch fire or otherwise be damaged. For this reason, it is desirable to extinguish the projection lamp when threading. This is accomplished by means of a switch 232 cooperative with the lever 91 to open the projection lamp circuit as seen in Fig. 14 when the lever 91 is brought to "threading" position. The switch 232 is mounted on the wall 10 to the rear of the lever 91 and is connected to the lever 91 by means of a link 233 which is pivotally connected at 234 to an arm 235 forming part of the switch 232. The other end of the link 233 is provided with a slot 236 adapted to be engaged by a pin 237 provided on the lever 91. When the lever 91 is thrown into "running" position as in Fig. 2, the arm 235 is pulled to the right closing the projection lamp circuit.

When the lever 91 is moved from "running" position to "stop" position, the pin 237 merely slides along the slot 236 thereby leaving the link 233 in the same position; consequently the projection lamp circuit will still remain closed. Further movement of the lever 91 into "threading" position, however, causes the link 233 to move to the left, opening the lamp circuit. After the projector has been threaded, it is desirable to again place the mechanism in "stop" position so as to attach the free end of the film to the take-up reel 8 and also to leave the projection lamp off. Therefore, it will be seen that when the lever 91 is moved from the "threading" position to the "stop" position, the pin 236 merely slides to the end of the slot 237 in the link 233 thereby leaving the projecting lamp circuit open.

Referring now to Figs. 1 and 16, it will be seen that the rear end of the motor shaft 170 has formed thereon a worm 240 adapted to engage a worm gear 241 rigidly mounted on a shaft 242 which is journaled in a bearing 243'. Loosely mounted on the shaft 242 is a pulley 243 having washers 244 and 245 preferably of leather or other fibrous material provided on either side thereof. The pulley 243 is adapted to drive a transmission belt 243' for the purpose of driving the take-up reel 8. The pulley 243 and washers 244 and 245 are placed between the face of the worm gear 241 and the face of a sleeve member 246 slidably mounted on the shaft 242. A spring 247 bears against the end of the sleeve member 246 and is engaged at its other end by the head of an adjusting screw 247' threadably mounted in the end of the shaft 242. By adjusting the screw 247 in and out, the friction between the worm gear 241 and the pulley 243 may also be varied.

Reversal of film

It is desirable at times to reverse the direction of the film through the projector, as, for example, to show a "still" picture of a scene previously shown in motion. This is accomplished by providing a reversing switch 248 in the motor circuit, as shown in Fig. 14, which changes the polarity of the armature in relation to that of the field and consequently reverses the motor 56.

Two-speed changeover control

It is well known to those familiar with the art that the sound pictures and silent pictures are run at different speeds, for example, the 16 mm. silent film is run at 16 frames per second, while the 16 mm. sound film is run at 24 frames per second. While the herein described projector is especially designed for sound film, it may be desirable at times to project silent film. To accomplish this result, I provide a speed governor diagrammatically shown at 250 in Fig. 14, which is attached to the motor shaft 170 of the motor 56. The governor 250 comprises a pair of centrifugally operated switches 251 and 252. Each of these switches 251, 252, comprises a stationary contact 253, 253', mounted on a circular plate 254" provided on the motor shaft 170 and a movable contact 254, 254', shown as being mounted on a spring arm 255, 255', fastened at its rear end to the plate 254". Each of the switches is so adjusted that the spring arm 255 flies out when the speed becomes too great, thereby opening the motor circuit until the motor falls back to its normal speed. In this particular case, one of the switches is adjusted to hold the motor at the speed required for sound pictures, while the other holds it at the required speed for silent projection. Both of the stationary contacts 253 and 253' are connected to a slip ring 256 while each of the movable contacts 254 and 254' is connected to slip rings 257 and 258. The central slip ring 256 is connected with the motor while the other two slip rings 257 and 258 are connected to a double throw switch 259 so that either of the switches 251 or 252 may be selectively connected to operate the motor at the speed desired. It will be seen, therefore, that if the switch 259 is thrown in the position shown in Fig. 14 so as to shunt the centrifugal switch 251 across the resistance 260, that the motor will gradually speed up until it exceeds the speed at which the switch 251 is set. This opens the short across the resistance thereby placing the resistance in series with the motor which cuts down the speed until it allows the contacts of the switch 251 to close again.

Operation

I will now briefly explain the operation of the mechanism in the various positions. When the lever 91 is thrown into "threading" position, the lever 95 is further drawn up, moving the lever 98 and consequently closing the loop formers 40 and 43 as seen in Fig. 3. This action also causes the fingers 125 and 126 mounted on the bar 102 to strike the ends of the bell cranks 115 and 116 thereby opening the film gate 52. At the same time the projection 165' on the bar 95 strikes the end of the lever 88 causing the tension springs in the sound gate 44 to be bowed to allow the film to be fed therethrough. Also, at this time, the cam follower 208 will ride on the lowermost portion of the cam surface 206 of the bar 95 thereby engaging the clutch 58 to drive the film feeding mechanism and consequently retracting the fire shutter 168. Also the sprocket 37 automatically propels the free end of a film through the apparatus as before described.

When the operating lever 91 is thrown into "running" position as shown in Fig. 2, the vertical bar 95 is drawn down thereby allowing the springs 104 and 109 to pull the loop formers into their retracted positions. Also, the cam follower 208 will ride on the uppermost portion of the cam projection 206 of the bar 95 thereby allowing the spring 200' to engage the clutch 58 and also retract the fire shutter 168. The film is propelled through the apparatus by sprocket 37, still or motion pictures, with or without synchronized sound, being reproduced from the film.

When the lever 91 is thrown into the "still" position as shown in Fig. 1, the bar 95 will be drawn up until the slot 96 barely touches the pin 97. Therefore, it will be seen that although the bar 95 is drawn up, the lever 98 and consequently the loop formers 40 and 43 remain in the same position as when in "running" position, but the cam follower 208 will ride on the lobe 206 of the lever 95 and thereby cause the fire shutter 168 to drop in position between the projection lamp 15 and the film gate 20, and also cause the clutch 58 to disengage thereby stopping the sprocket 37 and intermittent motion 51 to permit "still" projection.

What is claimed is:

1. A sound motion picture projector comprising a portable casing, a mounting plate in said casing, a sprocket, a picture aperture, a sound aperture, said sprocket being adapted to thread said film through said apertures, a loop former between said sprocket and said picture aperture, a loop former between said picture aperture and said sound aperture, a flywheel roller mounted in fixed position between said picture aperture and sound aperture, a pressure roller adjacent said flywheel roller, and cooperating therewith, a unitary support for said pressure roller and said second-mentioned loop former, said pressure roller and said second-mentioned loop former being pivoted about a common point, all of said aforementioned elements being mounted on said mounting plate, and means for positioning said loop formers in loop forming positions and simultaneously removing said pressure roller from said flywheel roller, said means being movable to another position for positioning said loop formers in inoperative position and said pressure roller in operative position with respect to said flywheel roller.

2. A sound motion picture projector in accordance with claim 1 in which said pressure roller is supported integrally with said second mentioned loop former and pivoted at a point therebetween.

3. A sound motion picture projector in accordance with claim 1 in which said pressure roller and second-mentioned loop former form part of the support therefor and means are provided for pivoting said support at a point intermediate said loop former and said pressure roller for separating said pressure roller from said flywheel roller when said loop former is in loop forming position.

4. A sound motion picture projector comprising a portable casing, a picture aperture and a sound aperture, a common sprocket for threading film through said apertures, said sprocket being adapted to advance said film past said sound aperture at a substantially constant speed, means for advancing said film past said picture aperture intermittently, upper and lower loop formers for forming loops between said sprocket and said picture aperture and between said picture aperture and said sound aperture, respectively, pressure gates at said picture and sound apertures, a flywheel roller mounted adjacent said sound aperture, a pressure roller cooperating with said flywheel roller and mounted on an extension of said lower loop former, interlinked means adapted to open and close said picture and sound pressure gates, to place said upper and lower loop formers in operative and inoperative positions and to place said pressure roller in operative and inoperative positions, a motor for rotating said sprocket and actuating said intermittent means, and means adapted to have three positions for operating said inter-linked mechanism and controlling the speed of said motor, one of said positions placing said loop formers in inoperative position, said pressure roller in operative position and said gates in closed position, and another position placing said loop formers in operative position, said pressure roller in inoperative position and said gates in open position.

5. A sound motion picture projector comprising a portable casing, a sprocket, a picture aperture, a sound aperture, said sprocket being adapted to thread said film through said apertures, a loop former between said sprocket and said picture aperture, a loop former between said picture aperture and said sound aperture, a flywheel roller mounted in fixed position between said picture aperture and sound aperture, a pressure roller adjacent said flywheel roller, and cooperating therewith, and means for positioning said loop formers in loop forming positions and for removing said pressure roller from said flywheel roller, said means being movable to another position for positioning said loop formers in inoperative position and said pressure roller in operative position with respect to said flywheel roller, said pressure roller and second-mentioned loop former being integrally mounted and pivoted at a point between said roller and loop former.

6. A sound motion picture apparatus comprising a portable casing, a picture gate and a sound gate, a common sprocket for threading film through said gates, said sprocket being adapted to advance said film past said sound gate at a substantially constant speed, means for advancing said film past said picture gate intermittently, upper and lower loop formers for forming loops between said sprocket and said picture gate and between said picture gate and said sound gate, respectively, pressure pads at said picture and sound gates, a flywheel roller mounted adjacent said sound gate, a pressure roller cooperating with said flywheel roller and mounted on an extension of said lower loop former, interlinked means adapted to open and close said picture and sound pressure pads, to place said upper and lower loop formers in operative and inoperative positions and to place said pressure roller in operative and inoperative positions, a motor for rotating said sprocket and actuating said intermittent means, and means adapted to have two positions for operating said interlinked mechanism and controlling the speed of said motor, one of said positions placing said loop formers in inoperative position, said pressure roller in operative position and said pads in closed position, and another position placing said loop formers in operative position, said pressure roller in inoperative position and said pads in open position.

ERNEST ROSS.